(No Model.)  5 Sheets—Sheet 1.
H. T. RUSSELL.
DIE FOR FORGING REAR FORKS OF BICYCLES.
No. 250,289.  Patented Nov. 29, 1881.
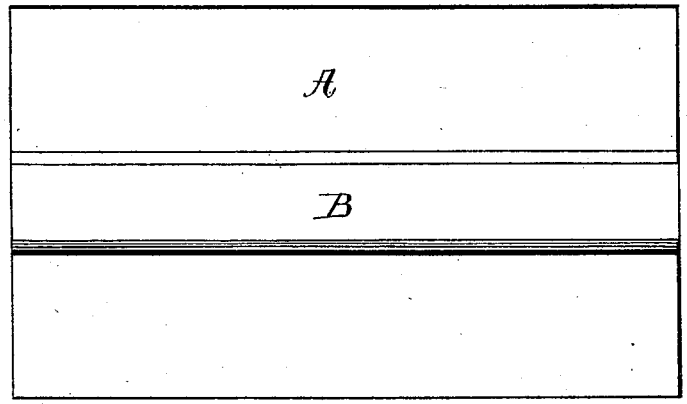
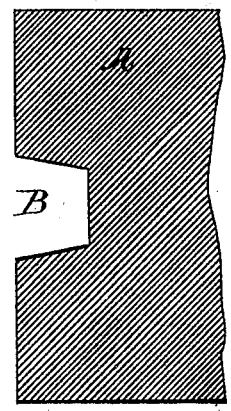
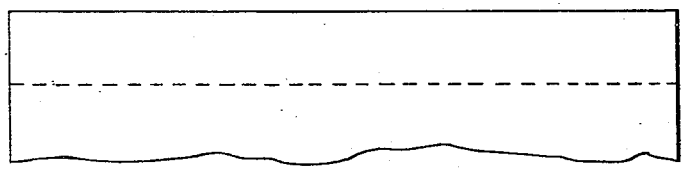
Fig. 1.
Fig. 2.
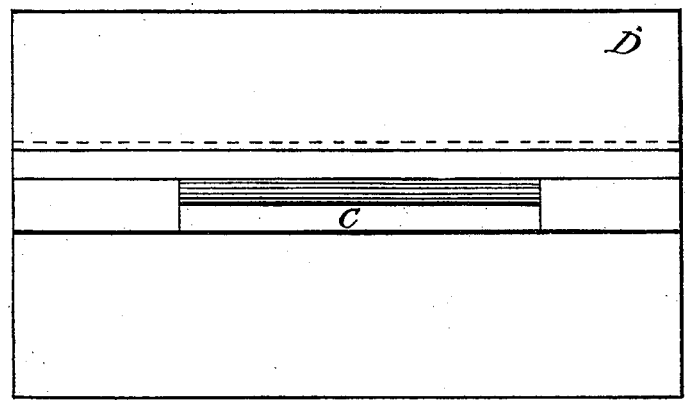
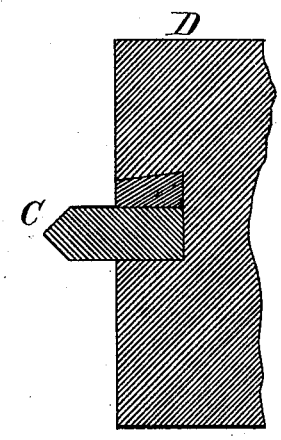
Fig. 3.
Fig. 4.
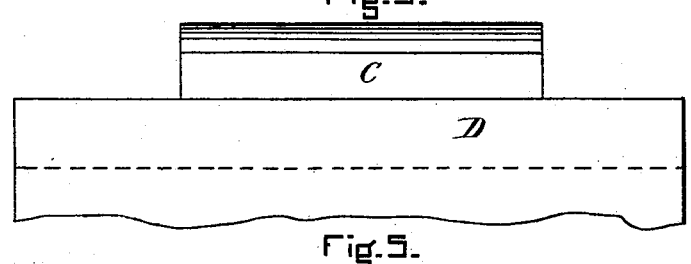
Fig. 5.
WITNESSES
E. H. Phalen.
F. F. Raymond
INVENTOR
Henry T. Russell,
By Charles E. Pratt,
Atty.
N. PETERS, Photo-Lithographer, Washington, D. C.

(No Model.) 5 Sheets—Sheet 2.

H. T. RUSSELL.
DIE FOR FORGING REAR FORKS OF BICYCLES.

No. 250,289. Patented Nov. 29, 1881.

WITNESSES
E. A. Phalen
F. F. Raymond 2d

INVENTOR
Henry T. Russell,
By Charles E. Pratt,
att'y (No Model.) 5 Sheets—Sheet 3.
H. T. RUSSELL.
DIE FOR FORGING REAR FORKS OF BICYCLES.

No. 250,289. Patented Nov. 29, 1881.

WITNESSES

INVENTOR
Henry T. Russell,
By Charles E. Pratt,
Atty (No Model.) 5 Sheets—Sheet 4.
H. T. RUSSELL.
DIE FOR FORGING REAR FORKS OF BICYCLES.

No. 250,289. Patented Nov. 29, 1881.

WITNESSES
INVENTOR
Henry T. Russell,
By Charles E. Pratt,
Atty.

(No Model.) 5 Sheets—Sheet 5.

H. T. RUSSELL.
DIE FOR FORGING REAR FORKS OF BICYCLES.

No. 250,289. Patented Nov. 29, 1881.

WITNESSES
E. A. Phalen.
O. A. Raymond 2d

INVENTOR
Henry T. Russell,
By Charles E. Pratt,
Att'y

United States Patent Office.

HENRY T. RUSSELL, OF HARTFORD, CONNECTICUT, ASSIGNOR TO THE POPE MANUFACTURING COMPANY, OF BOSTON, MASSACHUSETTS.

DIE FOR FORGING REAR FORKS OF BICYCLES.

SPECIFICATION forming part of Letters Patent No. 250,289, dated November 29, 1881.

Application filed March 11, 1881. (No model.)

*To all whom it may concern:*

Be it known that I, HENRY T. RUSSELL, of the city of Hartford, and State of Connecticut, have invented certain new and useful Improvements in Dies for Forging Rear Forks of Bicycles, of which the following is a specification.

My present improvements relate to that part of the bicycle known as the "back fork," or the bifurcated portion of the perch or backbone at its rear and lower end, and to a process of and machinery for making the same by dropforging in one solid piece of metal, ready for its juncture with the perch at one end, and to receive the bearings for the rear axle of the bicyle at its bifurcated end.

Heretofore this part of the bicyle, like most of the larger parts, has been made and forged by hand, entailing much labor, and requiring skill and the expenditure of much time and labor in finishing up the work or perfecting and polishing the curved parts after the forging; and the object of my present improvements is to perform this labor of forging by machinery rapidly and accurately and in a substantially finished form, so as to require little skilled labor in finishing.

Figure 18:
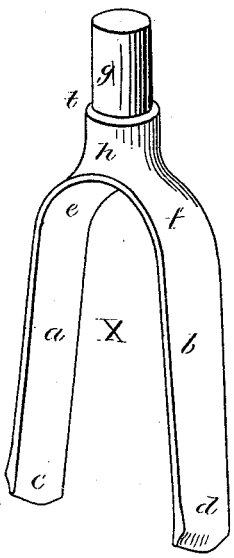

X in Figure 18 represents my improved rear fork in elevation, substantially as I produce it by the process and machinery herein to be described. It consists of the prongs or arms $a$ $b$, with what I may term the "abrupt ends" $c$ $d$, intended to receive the bearing parts for the rear axle, and having the thicker curved ends $e f$ approaching each other and uniting in the trunk $h$. This trunk $h$, which at its upper end is in the form of a cylinder, terminates in a rectangular shoulder, $t$, from which projects the plug $g$, intended to be inserted in the rear and smaller end of the perch, to which this rear fork is attached thereby and brazed.

Figure 7:
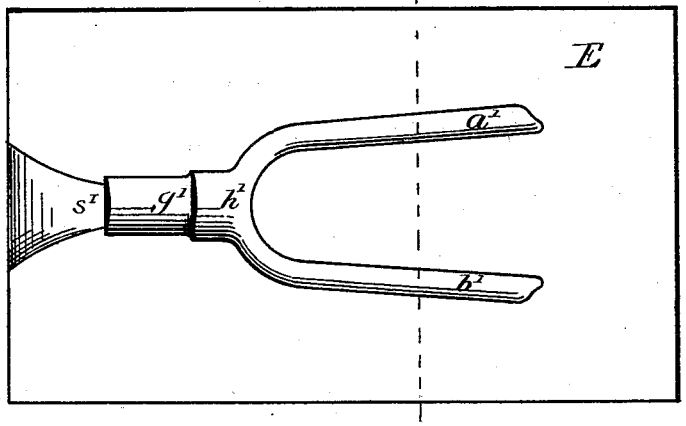
Figure 7:
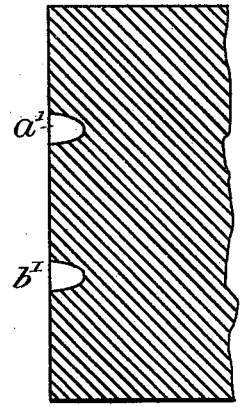
Figure 6:
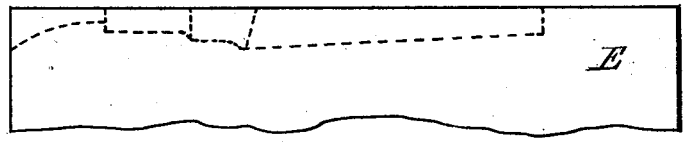
Figure 9:
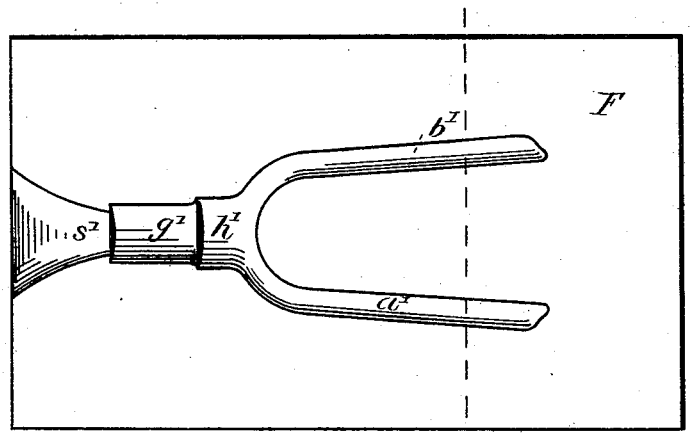
Figure 9:
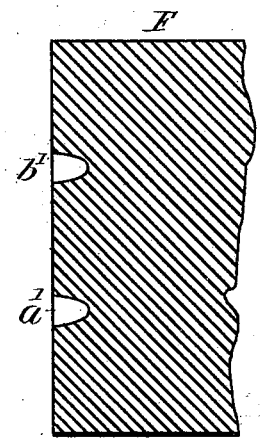
Figure 8:
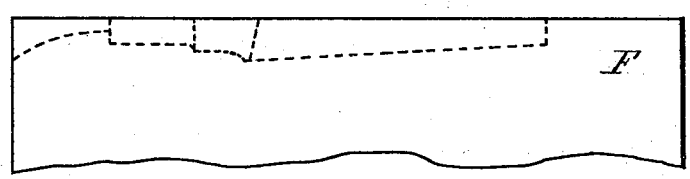
Figure 10:
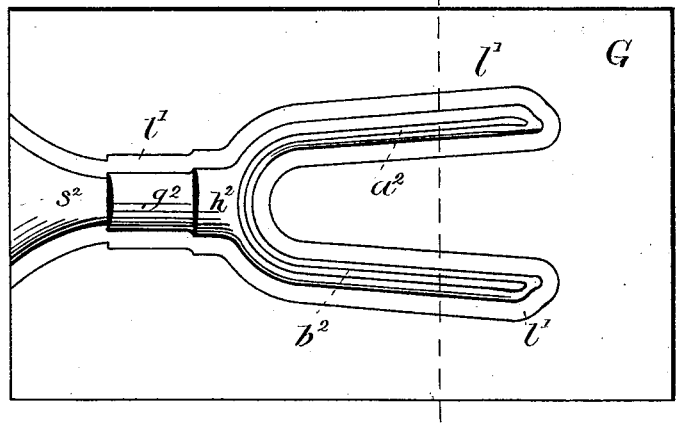
Figure 11:
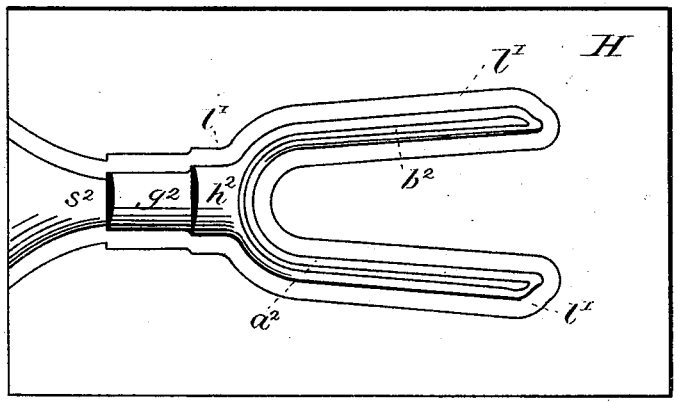
Figure 12:
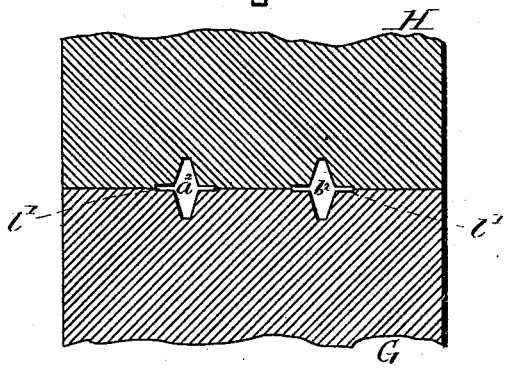
Figure 13:
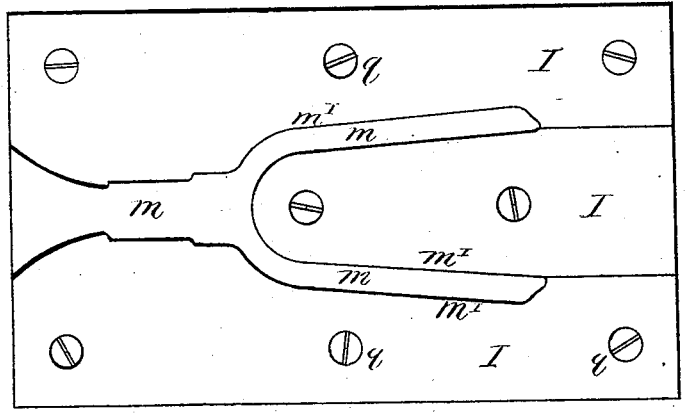
Figure 14:
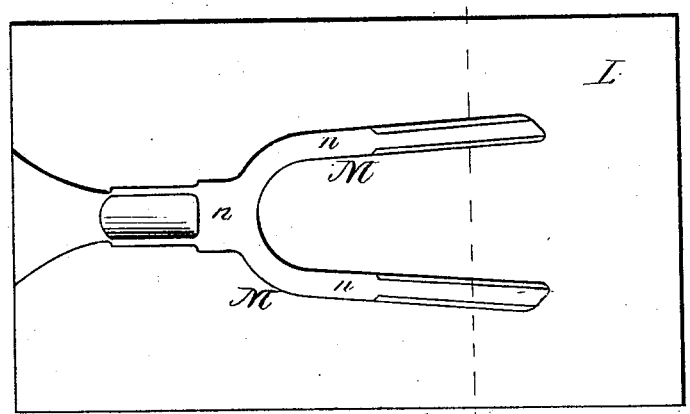
Figure 15:
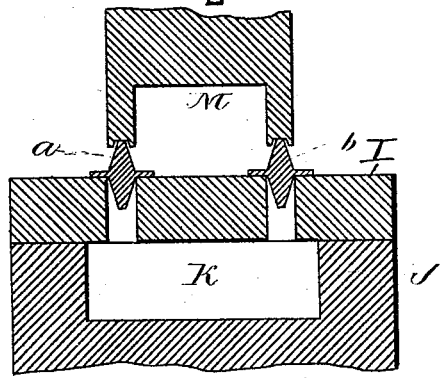
Figure 16:
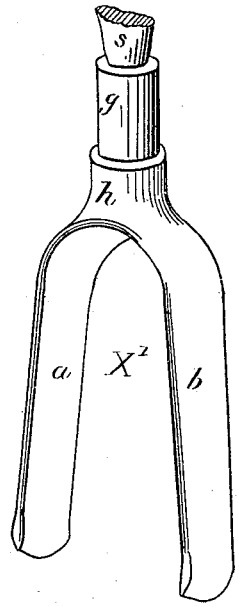
Figure 17:
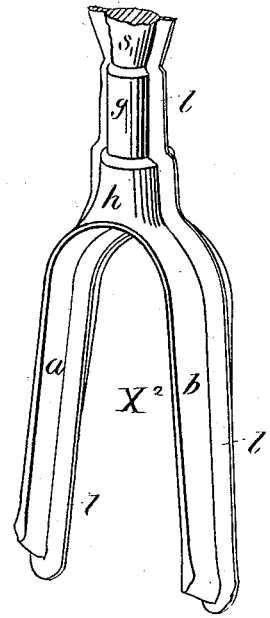

Fig. 1 represents, first in top plan and then in side elevation, a rough cast-iron or other metallic block or die, A, having the recess B; and Fig. 2 shows the same in section. Fig. 3 represents, in elevation, the same with a cutter die or block, D. Figs. 4 and 5 represent, respectively in section and in elevation, a cutter-block or die, D, bearing the cutter C. Figs. 6 and 8 show, in plan and side elevation, a pair of break-down dies; and Figs. 7 and 9 show the same in sections through the dotted lines of the former. Figs. 10 and 11 show, in plan, a pair of forming and finishing dies; and Fig. 12 shows a section through the same when brought together in position as in use. Fig. 13 shows, in plan, a trimmer, and Fig. 14 a punch, and Fig. 15 the punch and trimmer and the article operated upon as in position for operation. Fig. 16 shows the rear fork, X', substantially as it leaves the breakdown dies shown in Figs. 6 and 8; and Fig. 17 shows the same as it leaves the forming-dies shown in Figs. 10 and 11.

E and F are corresponding anvil and hammer dies or blocks, of cast-iron or other metal, adapted to be used in a drop-forge, having cut or cast in their surfaces the recesses or intaglios $a'$, $b'$, $h'$, $g'$, and $s'$, corresponding approximately to the proportions and curvature of the prongs $a b$, the trunk $h$, the plug $g$, and the sprue or connecting part between the part or end of the metallic bar of which these are forged and the remainder of the bar by which they are handled.

G and H are corresponding steel hammer and anvil dies, in the faces of which are cut the recess $s$ or intaglio parts $a^2 b^2 h^2 g^2 s^2$, corresponding in proportions and curvature exactly to the desired form to be given to the rear fork, X, and the sprue by which it is held to the bar, in its respective parts, while the recess $l' l' l'$ is a slight recess surrounding the others, intended for the flash $l$ or slight excess of metal struck or squeezed off in the process of forging, and which, were this recess $l'$ omitted, would prevent the dies G and H from coming quite together.

I is a steel plate of considerable thickness, which may be in one or more parts, and attached to a block, J, by screws $q q$, or otherwise, and which contains in its surface a recess or opening, $m m m$, the outline of which is formed by cutting-edges of the same, $m' m' m'$, exactly corresponding in curvature to the outline of the rear fork, X. The block J has also a cavity or opening, K, into which the article being trimmed may fall, and from which it may be withdrawn.

L is a block or die bearing the punch M M, which corresponds to the trimmer I, and the outline of which is substantially the same, but slightly smaller, than the outline of the opening $m\ m\ m$ in the trimmer I, and has the contour of its surface adapted substantially to the side form of the rear fork, X.

The process by which this machinery is used is as follows: An ordinary bar of iron or steel of proper size and substance is taken and heated for several inches from one end, as for ordinary forging. The die D, with its cutter C, and the recessed die A, being placed in proper position in a drop-forge, the heated end of the bar is laid longitudinally and centrally for a suitable distance—say five inches—upon the cutter C, and by a blow from the die A the bar is bifurcated. The heated bar is then withdrawn from the block B, and the operator, placing it first with one prong and then with the other upon a corner of the block A, or upon any suitable part of an anvil, with two or three blows of a common hammer bends the prongs to a form approximating that of the letter U. The bifurcated end of the bar is then heated, as for ordinary forging, and the break-down dies E and F being suitably placed in a drop-forge, the heated end of the bar is placed on the die E, so that the prongs substantially correspond with the recesses $a'$ $b'$, and with one or more blows from the die F the article is brought to an approximate form, as shown in Fig. 16. The fork end of the bar is again heated, and the forming-dies G and H being properly placed in a drop-forge, the fork is placed correspondingly upon the die G, and with one or more blows from the die H is forged into form, as shown in Fig. 17, some portion of the metal being driven off as flash $l\ l\ l$. The trimmer-bearing block J and the punch-bearing block L being suitably placed in a drop-forge, the fork is next placed in process of construction, without reheating, upon the trimmer I, and with a blow from the punch M the flash $l\ l\ l$ is removed. Then, either with or without reheating, as may be necessary, the fork is again placed in the forming and finishing die G, and receives one or more blows from the die H, completing and finishing the form; and if in this latter operation any flash should be formed, it is removed by the trimmer and punch, as before. It is then ready to be cut off at the plug $g$, on an ordinary anvil-cutter, and the rear fork, X, is complete and substantially finished, as shown in Fig. 18.

I claim as new and of my invention—

1. The break-down dies E and F, constructed with the recesses $a'$, $b'$, $h'$, and $g'$, and to operate substantially as and for the purposes set forth.

2. The forming and finishing dies G and H, constructed with the recesses $a^2$, $b^2$, $h^2$, $g^2$, and $l'$, and so as to operate substantially as and for the purposes set forth.

3. The trimmer I, with openings $m\ m\ m$, and punch M, with cameos $n\ n\ n$, constructed and adapted for removing the flash from the rear fork of a bicycle, substantially as herein shown and described.

HENRY T. RUSSELL.

Witnesses:
GEO. H. DAY,
E. J. POST.